US006315866B1

(12) United States Patent
Sanchez

(10) Patent No.: US 6,315,866 B1
(45) Date of Patent: *Nov. 13, 2001

(54) METHOD OF INCREASING THE DRY STRENGTH OF PAPER PRODUCTS USING CATIONIC DISPERSION POLYMERS

(75) Inventor: Jordi Roqué Sanchez, Barcelona (ES)

(73) Assignee: Nalco Chemical Company, Naperville, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/515,453

(22) Filed: Feb. 29, 2000

(51) Int. Cl.$^7$ ............................. D21H 21/14; D21H 21/18
(52) U.S. Cl. ..................................... 162/168.2; 162/168.3; 162/158
(58) Field of Search ............................. 162/168.2, 168.3, 162/158, 168.1, 179, 166, 164.6, 183, 191, 175; 210/731, 723, 726–727, 734–735, 725, 708, 928

(56) References Cited

U.S. PATENT DOCUMENTS

| | | | |
|---|---|---|---|
| 2,884,057 | | 4/1959 | Wilson et al. . |
| 4,388,150 | * | 6/1983 | Sunden et al. ................... 162/175 |
| 4,696,962 | * | 9/1987 | Danner et al. ................... 524/140 |
| 4,753,710 | * | 6/1988 | Langley et al. ................. 162/164.3 |
| 4,785,055 | * | 11/1988 | Dexter et al. ................... 525/356 |
| 4,795,531 | * | 1/1989 | Sofia et al. ..................... 162/164.6 |
| 4,913,775 | * | 4/1990 | Langley et al. ................. 162/164.3 |
| 4,929,655 | * | 5/1990 | Takeda et al. ................... 524/458 |
| 4,940,514 | * | 7/1990 | Stange et al. ................... 162/168.2 |
| 5,003,590 | * | 3/1991 | Lechner et al. ..................... 380/5 |
| 5,098,520 | * | 3/1992 | Begala ............................ 162/168.1 |
| 5,178,730 | * | 1/1993 | Bixler et al. ................... 162/168.3 |
| 5,185,062 | * | 2/1993 | Begala ............................ 162/168.1 |
| 5,221,435 | * | 6/1993 | Smith, Jr. ....................... 162/164.1 |
| 5,254,221 | * | 10/1993 | Lowry et al. ................... 162/168.2 |
| 5,320,711 | * | 6/1994 | Dauplaise et al. ............... 162/168.2 |
| 5,334,679 | * | 8/1994 | Yamamoto et al. ................. 526/200 |
| 5,338,406 | | 8/1994 | Smith . |
| 5,466,338 | * | 11/1995 | Pearson .......................... 162/168.2 |
| 5,510,004 | * | 4/1996 | Allen ............................. 162/168.2 |
| 5,587,415 | * | 12/1996 | Takeda ............................ 524/458 |
| 5,891,304 | * | 4/1999 | Shing ............................. 162/168.2 |
| 6,059,930 | * | 5/2000 | Wong Shing et al. ............ 162/168.2 |
| 6,071,379 | * | 6/2000 | Wong Shing et al. ............ 162/168.2 |
| 6,171,505 | * | 1/2001 | Maury et al. ..................... 210/727 |

FOREIGN PATENT DOCUMENTS

WO 98/36127   8/1998   (WO) .

OTHER PUBLICATIONS

"Paper Chemistry, An Introduction", D. Eklund and T. Lindstrom, DT Paper Science Publications, Grankulla, Finland 1991.

* cited by examiner

*Primary Examiner*—Jose Fortuna
(74) *Attorney, Agent, or Firm*—Michael B. Martin; Thomas M. Breininger

(57) ABSTRACT

This invention is directed to method for improving the dry strength of a paper product using a single cationic dispersion polymer strength additive, wherein the cationic dispersion polymer is prepared by polymerizing in an aqueous solution of a polyvalent anionic salt in the presence of a dispersant:

i. a cationic diallyl-N,N-disubstituted ammonium halide monomer of formula

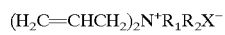

wherein $R_1$ and $R_2$ are independently $C_1$–$C_{20}$ alkyl, aryl or arylalkyl and X is an anionic counterion and ii. an acrylamide monomer of formula

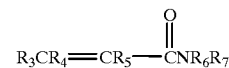

wherein $R_3$ and $R_4$ are independently hydrogen, $C_1$–$C_{10}$ alkyl, aryl or arylalkyl; $R^5$ is hydrogen or methyl and $R_6$ and $R_7$ are independently hydrogen or $C_1$–$C_{10}$ alkyl.

5 Claims, No Drawings

METHOD OF INCREASING THE DRY STRENGTH OF PAPER PRODUCTS USING CATIONIC DISPERSION POLYMERS

TECHNICAL FIELD

This invention concerns a method of improving the dry strength of paper products using a single cationic dispersion polymer strength additive.

BACKGROUND OF THE INVENTION

Various properties of paper products, including strength, opacity, smoothness, porosity, dimensional stability, pore size distribution, linting propensity, density, stiffness, formation and compressibility are primarily are to a large extent dependent on the bonds which exist between the cellulosic fibres in the paper. The bonding capability of these fibers is enhanced by the mechanical beating or refining step(s) of the papermaking process, during which the fibers are made more flexible and the available surface area is increased.

The strength of paper products is a property having three categories, referred to as dry strength, wet strength or rewetted strength, and wet web strength. Dry strength is the tensile strength exhibited by the dry paper sheet, typically conditioned under uniform humidity and room temperature conditions prior to testing. Wet strength, or rewetted strength, is the tensile strength exhibited by a paper sheet that has been fully dried and then rewetted with water prior to testing. Wet web strength is strength of a cellulosic fiber mat prior to drying to a paper product.

Strength resins are polymers generally added at the wet end of the papermaking process to the cellulosic slurry, prior to the formation of the paper mat or sheet, to improve the strength characteristics of the paper product. Strength resins are generally believed to work by supplementing the number of interfiber bonds.

Dry strength additives are used to increase the dry strength of various paper products including paper, paperboard, tissues and others. Dry strength additives are particularly useful in the manufacture of paper products from recycled fibers, as recycling is known to have a weakening effect on the resulting paper. In addition, dry strength additives should reduce the amount of refining required to achieve a given dry strength for a given pulp, and the corresponding energy consumption required for refining and should not adversely affect the drainage rate of the cellulose web on the papermaking machine.

Various polyacrylamides have been used as wet-end additives to increase dry strength of paper products. The polyacrylamides are particularly useful as dry strength additives as they contain primarily amide groups which can form hydrogen bonds so that the interfiber bonds in the paper sheet increase without the increase in wet strength caused by covalent crosslinks. The polyacrylamides are generally also water-soluble which leads to a uniform distribution in the stock and a uniform adsorption on the surfaces of the fibers. See Paper Chemistry, An Introduction, D. Eklund and T. Lindstrom, DT Paper Science Publications, Grankulla, Finland (1991).

The use of certain cationic copolymers of acrylamide and α,β-unsaturated quarternary ammonium compounds as dry strength additives is disclosed in U.S. Pat. No. 2,884,057.

A polyelectrolyte complex comprising at least one high molecular weight, low charge, water soluble cationic polymer and at least one anionic polymer for increasing the dry strength of paper is disclosed in U.S. Pat. No. 5,338,406.

Copolymers of acrylamide and diallyldimethylammonium chloride or methacryloyloxyethyltrimethylammonium chloride are recited as preferred cationic polymers.

A papermaking process that utilizes mixtures of wet strength agents and dry strength agents, including cationic acrylamide-diallyldimethylammonium halide copolymers, to produce paper having increased wet strength without compromising dry strength is disclosed in PCT/US98/01980.

However, the need still exists for a sole treatment agent for increasing the dry strength of paper products.

SUMMARY OF THE INVENTION

I have discovered that the dry strength of paper products may be improved by using certain cationic dispersion polymers as the sole strength additive.

Accordingly, in its principal aspect, this invention is directed to a method for improving the dry strength of a paper product comprising a) adding to an aqueous cellulosic papermaking slurry an effective amount of a single cationic dispersion polymer strength additive, wherein the cationic dispersion polymer is prepared by polymerizing in an aqueous solution of a polyvalent anionic salt in the presence of a dispersant:

i. a cationic diallyl-N,N-disubstituted ammonium halide monomer of formula

wherein $R_1$ and $R_2$ are independently $C_1$–$C_{20}$ alkyl, aryl or arylalkyl and X is an anionic counterion and ii. an acrylamide monomer of formula

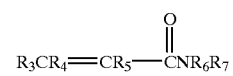

wherein $R_3$ and $R_4$ are independently hydrogen, $C_1$–$C_{10}$ alkyl, aryl or arylalkyl;

$R_5$ is hydrogen or methyl and $R_6$ and $R_7$ are independently hydrogen or $C_1$–$C_{10}$ alkyl;

b) draining the slurry to form a sheet; and c) drying the sheet.

The cationic dispersion polymer is water-soluble and dissolves rapidly resulting in a homogeneous distribution of the polymer over the cellulose fiber web. After drying, the cellulose fiber web possesses materially greater dry strength than that possessed by untreated cellulose fiber webs. This polymer deposition is irreversible and the polymer will not be removed by any subsequent step to which the fibers are normally subjected in the manufacture of paper.

The cationic dispersion polymer of this invention is useful for increasing the dry strength of a number of paper products including Kraft, tissue, testliner, duplex topside white paper, cardboard and shaped or molded paperboard. Use of the cationic polymers of this invention as dry strength additives is particularly advantageous as the use of additional strength agents, such as wet strength additives is not required.

In addition to increasing dry strength, the cationic dispersion polymers described herein confer additional advantages to the papermaking process including improved retention and drainage, reduction of refining time resulting in lower production costs, improved sheet formation and increased paper sheet brightness. The cationic dispersion polymers also permit the use of less costly, lower quality grade of recycle furnish in the furnish mixture while still achieving the desired paper characteristics.

DETAILED DESCRIPTION OF THE INVENTION

"Dry strength additive" means an additive that, when added to the papermaking process, increases the dry strength of the paper by about 10 percent or more.

"Monomer" means a polymerizable allylic, vinylic or acrylic compound.

"Cationic diallyl-N,N-disubstituted ammonium monomer" means a compound of formula $(H_2C=CHCH_2)_2N^+ R_1R_2X^-$ wherein $R_1$ and $R_2$ are independently $C_1$–$C_{20}$ alkyl, aryl or arylalkyl and X is an anionic counterion. Diallyl-N,N-disubstituted ammonium monomers are well-known and commercially available from a variety of sources. Representative cationic diallyl-N,N-disubstituted ammonium halide monomers include N-methyl-N-ethyl-N,N-diallyl ammonium chloride and diallyldimethyl ammonium chloride (DADMAC). A preferred cationic diallyl-N,N-disubstituted ammonium monomer is DADMAC.

"Anionic counterion" means any organic or inorganic anion which neutralizes the positive charge on the quaternary nitrogen atom of the cationic diallyl-N,N-disubstituted ammonium monomer. Representative anionic counterions include halogen, sulfate, phosphate, monohydrogen phosphate, nitrate, and the like. A preferred anionic counterion is halogen.

"Acrylamide monomer" means a monomer of formula

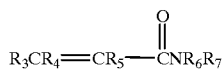

wherein $R_3$ and $R_4$ are independently hydrogen, $C_1$–$C_{10}$ alkyl, aryl or alkylaryl; $R_5$ is hydrogen or methyl and $R_6$ and $R_7$ are independently hydrogen or $C_1$–$C_{10}$ alkyl. Representative acrylamide monomers include acrylamide, (meth) acrylamide, ethyl hexyl (meth)acrylamide, diethylaminopropyl (meth)acrylamide, dimethylaminohydroxypropyl (meth)acrylamide, N-isopropyl (meth)acrylamide, N-tert-butyl (meth)acrylamide, $C_1$–$C_{10}$ N-alkyl acrylamide, $C_1$–$C_{10}$ N-alkyl methacrylamide, N-aryl acrylamide, N-aryl methacrylamide, N-arylalkyl acrylamide, N-isopropyl (meth)acrylamide, N,N-dimethylacrylamide (meth) acrylamide, $C_1$–$C_{10}$ N,N-dialkyl acrylamide, $C_1$–$C_{10}$ N,N-dialkyl methacrylamide, N,N-diaryl acrylamide, N,N-diaryl methacrylamide, N,N-diallylalkyl acrylamide, and N,N-diarylalkyl methacrylamide, and the like. Acrylamide and (meth)acrylamide are preferred, acrylamide is more preferred.

"Alkyl" means a monovalent group derived from a straight or branched chain saturated hydrocarbon by the removal of a single hydrogen atom. Representative alkyl groups include methyl, ethyl, n- and iso-propyl, n-, sec-, iso- and tert-butyl, and the like.

"Alkoxy" and "alkoxyl" mean an alkyl-O— group wherein alkyl is defined herein. Representative alkoxy groups include methoxyl, ethoxyl, propoxyl, butoxyl, and the like.

"Alkylene" denotes a divalent group derived from a straight or branched chain saturated hydrocarbon by the removal of two hydrogen atoms. Representative alkylene groups include methylene, 1,2-ethylene, 1,1-ethylene, 1,3-propylene, 2,2-dimethylpropylene, and the like.

"Aryl" means an aromatic monocyclic or multicyclic ring system of about 6 to about 20 carbon atoms, preferably of about 6 to about 10 carbon atoms. The aryl is optionally substituted with one or more alkyl, alkoxy, halogen or haloalkyl groups. Representative aryl groups include phenyl or naphthyl, or substituted phenyl or substituted naphthyl. A preferred substituent is alkyl.

"Arylalkyl" means an aryl-alkylene— group wherein aryl and alkylene are defined herein. Representative arylalkyl include benzyl, phenylethyl, phenylpropyl, 1-naphthylmethyl, and the like. Preferred arylalkyl are benzyl and phenethyl.

"Halogen" means fluorine, chlorine, bromine or iodine.

"Haloalkyl" means an alkyl group, as defined herein, having one, two, or three halogen atoms attached thereto. Representative haloalkyl groups include chloromethyl, bromoethyl, trifluoromethyl, and the like.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;

$\eta_o$=viscosity of solvent at the same temperature; and c=concentration of polymer in solution.

As used herein, the units of concentration "c" are (grams/100 ml or g/deciliter). Therefore, the units of RSV are dl/g. The RSV is measured at 30° C. The viscosities $\eta$ and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 0.5 dl/g. For the RSV measurements reported herein, the polymer concentration used is 0.045% polymer actives dissolved in a 1.0N ammonium nitrate solution.

Similar RSVs measured for two linear polymers of identical or very similar composition is one indication that the polymers have similar molecular weights, provided that the polymer samples are treated identically and that the RSVs are measured under identical conditions.

"Intrinsic viscosity" (IV) means RSV in the limit of infinite polymer dilution (i.e. the intercept where polymer concentration is extrapolated to zero). The IV, as used herein, is obtained from the y-intercept of the plot of RSV versus polymer concentration in the range of 1 to 0.33 weight percent polymer.

"Dispersion polymer" means a fine dispersion of a water-soluble polymer in an aqueous continuous phase containing one or more inorganic salts and one or more dispersants. Representative examples of dispersion polymerization of water-soluble polymers in an aqueous continuous phase are found in U.S. Pat. Nos. 4,929,655; 5,006,590; 5,597,859; 5,597,858; and European patent nos. 630,909 and 657,478.

"Cationic dispersion polymer" means a dispersion polymer as defined herein possessing a net positive charge.

Dispersants, also referred to as particle stabilizing polymers or stabilizers, keep the formed polymer particles from becoming agglomerated and forming a gel rather than a fine dispersion of particles. Suitable dispersants include water-soluble high molecular weight cationic polymers. The dispersant is preferably soluble in the aqueous salt solution.

The dispersant is used in an amount of from about 1 to about 15% by weight based on the total weight of the polymer.

Representative dispersants include homopolymers of cationic diallyl-N,N-disubstituted ammonium monomers or N,N-dialkylaminoethyl(meth)acrylate monomers and quaternary salts thereof such as the methyl chloride quaternary salt and benzyl chloride quaternary salt and cationic polymers comprising 20 mole % or more of cationic diallyl-N,N-disubstituted ammonium monomers or N,N-dialkylaminoethyl(meth)acrylate monomers and their quaternary salts and one or more nonionic monomers, preferably acrylamide or (meth)acrylamide. The performance of the dispersant is not greatly affected by molecular weight. However, the molecular weight of the dispersant is preferably in the range of about 10,000 to 10,000,000. Preferred dispersants include homopolymers of diallyldimethyl ammonium chloride, dimethylaminoethylacrylate methyl chloride quaternary salt and dimethylaminoethylmethacrylate methyl chloride quaternary salt and mixtures thereof.

Polyvalent anionic salts suitable for preparing the cationic dispersion polymer include inorganic or organic sulfates, phosphates and chlorides or a mixture thereof. Preferred anionic salts include ammonium sulfate, sodium sulfate, magnesium sulfate, aluminum sulfate, ammonium hydrogen phosphate, sodium hydrogen phosphate, potassium hydrogen phosphate and ammonium chloride. The salts are used in aqueous solution having a concentration of 15% or above.

The cationic dispersion polymers for use in this invention are made by preparing a mixture of water, one or more polyvalent anionic salts, an acrylamide monomer, a cationic diallyl-N,N-disubstituted ammonium monomer, any polymerization additives such as chelants, pH buffers or chain transfer agents and a dispersant and charging the mixture to a reactor equipped with a mixer, a thermocouple, a nitrogen purging tube, and a water condenser. The monomer solution is mixed vigorously, heated to the desired temperature, and then a water-soluble initiator is added. The monomers and initiators may be added in a single portion at the start of polymerization (batch polymerization) or in part at the start of polymerization with the remaining quantities being added in portions or continuously during the polymerization (semi-batch polymerization). The solution is purged with nitrogen while maintaining temperature and mixing for several hours. During the course of the reaction, a discontinuous phase containing the water-soluble polymer is formed. After this time, the products are cooled to room temperature, and any post-polymerization additives are charged to the reactor. The cationic dispersion polymer is a free flowing liquid with product so viscosities generally 100–10,000 centipoises, as measured at low shear.

A multifunctional alcohol such as glycerin or polyethylene glycol may also be included in the polymerization system. The deposition of the fine particles is smoothly carried out in the presence of these alcohols. Additionally, polymer weight and structure modifying agents such as sodium formate may be added to the solution to facilitate particle formation and precipitation and regulate polymer molecular weight and structure.

The polymerization reaction is initiated by any means which results in generation of a suitable free-radical. Thermally derived radicals, in which the radical species results from thermal, homolytic dissociation of a water-soluble azo, peroxide, hydroperoxide and perester compound are preferred. Especially preferred initiators are azo compounds including 2,2'-azobis(2-amidinopropane)dihydrochloride and 2,2'-azobis(N,N'-dimethyleneisobutylamidine) dihydrochloride, and the like.

A seed polymer may be added to the reaction mixture before the initiating polymerization of the monomers for the purpose of obtaining a fine dispersion. The seed polymer is a water-soluble cationic polymer insoluble in the aqueous solution of the polyvalent anion salt. The monomer composition of the seed polymer need not be identical to that of the water-soluble cationic polymer formed during polymerization. The seed polymer is preferably a polymer prepared from the above monomer mixture by the process described herein.

The cationic dispersion polymers described herein confer additional advantages to the papermaking process. Specifically, the cationic dispersion polymers are used without the unwanted addition of oils and surfactants as compared to conventional cationic latex polymers, imparting both processing and environmental benefits. Additionally, these cationic dispersion polymers require no inverter system and can be introduced to the papermaking process using simple feeding equipment resulting in savings in manpower and water resources.

The cationic dispersion polymers of this invention also offer advantages over dry polymer products. In most cases, conventional water-soluble polymers are now commercially available in a powder form. Prior to use, the polymeric powder must be dissolved in an aqueous medium for actual application. The polymer swells in aqueous medium, and the dispersed particles flocculate. It is typically very difficult to dissolve the conventional polymers in an aqueous medium. By contrast, the cationic dispersion polymers of this invention, by their nature, avoid dissolution-related problems.

The cationic dispersion polymers of this invention also offer advantages over solution polymer products. In general, solution polymerization is used to prepare lower molecular weight polymers, as the solution tends to become too viscous as the polymer molecular weight increases. Use of dispersion polymerization techniques as described herein allow for the preparation of free-flowing high molecular weight, high polymer actives polymer compositions whereas the corresponding solution polymer would otherwise be too viscous for use without prior dilution.

In a preferred aspect of this invention, the cationic diallyl-N,N-disubstituted ammonium monomer is diallyldimethyl ammonium chloride and the acrylamide monomer is acrylamide.

In another preferred aspect, the cationic dispersion polymer has a cationic charge of from about 5 mole % to about 85 mole %.

In another preferred aspect, the cationic dispersion polymer has a RSV of from about 0.5 to about 8 deciliters per gram.

In another preferred aspect, the cationic dispersion polymer has a cationic charge of from about 10 mole percent to about 50 mole percent.

In another preferred aspect, the cationic dispersion polymer has a RSV of from about 2 to about 6 deciliters per gram.

In another preferred aspect, the dispersion polymer has a cationic charge of about 30 mole percent.

The cationic dispersion polymer may be added at any point in the papermaking process so long as the polymer contacts the cellulose fibers as a homogeneous aqueous solution and is thoroughly blended with the fibers. For example, the cationic polymer dispersion may be added directly into the pulper without additional dilution. However, better performance as a strengthening agent, and also as a drainage and retention aid is achieved by dosing closer to the head box of the paper machine. In general, higher doses of the cationic dispersion polymer are preferred for application far from the head box and lower doses are preferred for application closer to the head box. In cases where the cationic polymer dispersion is added very close to the head box, additional dilution is readily accomplished by diluting the product in-line using a T-tube to feed the dispersion into water.

The selection of the dosage point and dilution depends on the particular circumstances of each case and can be readily determined by those of ordinary skill in the papermaking art. Typically, concentrations of from about 1 percent to about 10 percent, preferably of from about 1 percent to about 5 percent by weight are used for dilution of the cationic dispersion polymer prior to dosing.

Dilution of the cationic dispersion polymer is typically made by using clear fresh water (normally tap water is adequate). However, process water can also be used for dilution. In general, using worse quality waters may significantly decrease the effectiveness of the polymer solution.

A total dose of from about 1 kg of cationic polymer dispersion/ton of dry paper product to about 15 kg of cationic polymer dispersion/ton of dry paper product is preferred, with a lower dose being required for addition closer to the head box.

In a more preferred aspect, a dose of from about 3 to about 15 kg/ton is used before the pressure screen or a dose of from about 1 to about 10 kg/ton is used after the pressure screen of the paper machine.

The dry strength additive of this invention may be used along with conventional inorganic fillers, dyes and retention and drainage programs.

The selection of the retention and drainage program is not critical for use of the invention described herein. In general each individual furnish is to some extent unique and the type and amount of retention/drainage aid required will be optimized by laboratory testing. For example the mill may be operating in an acid or alkaline condition which will control which inorganic fillers are used. Clay is generally used as filler in acid while calcium carbonate is preferred in alkaline systems Titanium dioxide sheet modifier will often be added to either type of system.

Representative retention and drainage programs used by those knowledgeable in papermaking may contain cationic coagulants such as the reaction product of epichlorohydrin with dimethylamine with or without added ammonia, ammonia-dichloroethane condensates, poly(ethyleneimine), poly(diallyldimethylammonium chloride) or other suitably prepared cationic products. Inorganic coagulants such as alum or poly(aluminum chloride) may also be used separately or in conjunction with the above organic cationic coagulants. Frequently, cationic starch is also added to the finish and will act as a cationic coagulants Cationic flocculants which may be used are usually selected from copolymers of acrylamide with dimethylaminoethylacrylate or dimethylaminoethyl methacrylate which have been quaternized. Also used are acrylamide copolymers with diallyldimethylammonium chloride.

Anionic flocculants which may be used can be selected from copolymers of acrylamide with acrylic acid or a salt thereof and acrylamidomethylpropane sulfonic acid or a salt thereof.

The retention and drainage program may also use an anionic colloidal particle such as silica, bentonite or cross-linked acrylamide-acrylic acid polymers.

The foregoing may be better understood by reference to the following Examples which are presented for purposes of illustration and are not intended to limit the scope of the invention.

EXAMPLE 1

A representative dispersion copolymer of diallyldimethyl ammonium chloride and acrylamide in 30/70 mole ratio is synthesized as follows:

26.449 g of a 49.5% solution of acrylamide (0.1842 moles), 167.918 g of a 62.0% solution of DADMAC (0.6439 moles), 208.22 g of ammonium sulfate, 41.64 g of sodium sulfate, 314.11 g of deionized water, 0.62 g of sodium formate, 41.64 g of a 15% solution of poly (DMAEA.MCQ) (dimethylaminoethylacrylate methyl chloride quaternary salt, IV=2.0 dl/gm) and 0.42 g of ethylenediaminetetra acetic acid tetra sodium salt are added to a two liter resin reactor equipped with a stirrer, temperature controller, and water cooled condenser. The mixture is heated to 42° C. and 4.7 g of a 10% solution of 2,2'-azobis(N,N'-dimethylene isobutryramidine) dihydrochloride are added. The resulting solution is sparged with 1000 cc/min of nitrogen. After 5 minutes, polymerization begins and the solution becomes viscous. Forty-five minutes after the reaction begins, a solution containing 183.881 g of 49.5% acrylamide (1.280 moles) is pumped into the reactor over a period of 6 hours using a syringe pump. After addition of the semi-batch monomer the dispersion is then further reacted for 4 hours at a temperature of 42° C. After the reaction mixture is cooled, 10.41 g of deionized water is added dropwise to the reaction mixture. The resulting polymer dispersion has a Brookfield viscosity of 1500 cps and contains 20.8% of a 50 weight percent copolymer of DADMAC and AcAm with a reduced specific viscosity of 5.0 dl/gm as measured in 1.0 molar $NaNO_3$ for a 0.045% polymer solution.

The effectiveness of the cationic dispersion polymer in increasing the dry strength of various paper products is compared to the effectiveness of other, commonly used cationic dry strength additives in Tables 1–5. In Tables 1–5, polymer dosages are reported in kg of undiluted polymer product/ton of dry paper product.

Polymer A is a 20% polymer actives dispersion copolymer of diallyldimethyl ammonium chloride and acrylamide in 30/70 mole ratio having an RSV of 4–5 dl/g that is representative of the cationic dispersion polymers of this invention.

Polymer B is a glyoxylated acrylamide-diallyldimethylammonium chloride solution polymer available from Acideka, S. A., Bilbao, Spain.

Polymer C is an acrylamide-diallyldimethylammonium chloride latex copolymer available from Derypol, S. A., Barcelona, Spain.

Polymer D is a acrylamide-methacryloxyethyldimethylbenzylammonium chloride solution copolymer, available from Derypol, S. A., Barcelona, Spain.

As shown in Tables 1–5, the cationic dispersion polymers of this invention are superior dry strength additives for use in manufacturing a variety of paper products. Use of these dispersion polymers allows for increases in dry strength comparable to those obtained using currently available cationic dry strength additives at lower polymer dose.

EXAMPLE 2

The results presented in Table 1 are for paper furnish from a cardboard manufacturer in Spain. The furnish consists of 70% short fibers from recycled cardboard cartons and 30% long fibers from Kraft. The breaking weight is reported as the average of three trials at the indicated polymer dose. Results in Table 1 are obtained using a PROTEO dynamometer (028.DN.002, available from Ingenieria Aplicación y Desarrollo, S. L., Gipúzcua, Spain). The sample paper sheets used in this testing are prepared by placing 3 grams of dry paper fiber into a beaker. The fiber is agitated using a magnetic stirrer and the desired level of chemical is added directly to the fiber. The mixture is stirred for 10 minutes before dilution to 1.0 liter with water. The solution is then added to the sheet forming machine (786.FH.398 RAPID KÖTEM brand, available from Ingenieria Aplicación y Desarrollo, S. L., Guipuúzcua, Spain). The formed sheet is then dried for 15–20 minutes at 70–80° C. The dry sheets are then cut into test strips using a paper cutter. The test strips are then used for testing with the dynamometer. The test strips used in Table 1 are cut into strips 15 mm in width by 250 mm in length.

TABLE 1

| Polymer Product | Polymer Dose Kg/ton | Breaking Weight (average) | Percent Increase |
|---|---|---|---|
| None | | 3.433 | |
| B | 30 | 3.607 | 5.1 |
| A | 10 | 4.233 | 23.3 |
| A | 15 | 4.326 | 26 |

EXAMPLE 3

The data presented in Table 2 are for paper furnish from a high strength cardboard manufacturer in Spain. Results from Table 2 are obtained using the general methods described in Example 2. The test strips used in the dynamometer varied from those used in Example 2 in that the paper is cut into strips 2 mm in width by 250 mm in length.

TABLE 2

| Test | Polymer | Polymer Dose | Dry breaking length (m) | Breaking weight (kgf) | Elongation (mm) |
|---|---|---|---|---|---|
| 1 | A | 3.3 kg/ton | 12741 | 17.200 | 9.75 |
| 2 | | | 12825 | 17.314 | 9.42 |
| 3 | | | 12811 | 17.294 | 9.23 |
| 5 | Blank | | 11660 | 15.741 | 9.41 |
| 6 | | | 12111 | 16.350 | 10.87 |

EXAMPLE 4

Table 3 is a comparison of maximum dry breaking length (m) at a given dose of polymer for a furnish from a Kraft paper manufacturer in Spain. Results from Table 3 are obtained using an INSTRON 1026 dynamometer (available from Instron Limited Sucursal en España, S. A., Barcelona, Spain). The sample paper sheets used in this testing are prepared by weighing out a desired quantity of paper furnish into a graduated cylinder. The furnish is agitated with a spatula and then added to the FH-01 brand sheet forming machine (available from Metrotec, S. A., Guipúzcua, Spain). The desired quantity of dilution water and the desired quantity of dry strength chemical are then added to the machine to produce a consistent concentration of pulp in the resulting furnish solution. The solution is agitated again with a spatula prior to the release of the furnish trough of the machine where the fibers are retained to form the test sheet. While on the machine screen, vacuum is applied to the sheet for two minutes before the sheet is removed and placed under absorbent paper for one day. The test sheets are then hung up to air dry for two days. Each sheet is then cut with a paper cutter into 10 test strips of 2 cm in width by 10 mm in length. The cut strips are kept for one day before testing with the dynamometer.

TABLE 3

| Polymer Dose (Kg/Tn) | Blank | A | D | C | B |
|---|---|---|---|---|---|
| — | 1253 | | | | |
| 1 | | 1024.5 | 879 | | |
| 2 | | 1257 | 917 | | |
| 3.4 | | | | 1047 | |
| 4 | | 1239 | | | |
| 4.6 | | | | 944 | |
| 5.25 | | | 804 | | |
| 5.6 | | | | 888 | |
| 6 | | 1458.5 | | | |
| 6.8 | | | | 847 | |
| 7 | | | 818 | | |
| 7.5 | | 1491 | | | |
| 8.75 | | | 976 | | |
| 9 | | 1413 | | | |
| 10.5 | | | 1040 | | |
| 15 | | | | | 1293 |
| 20 | | | | | 1354 |
| 30 | | | | | 1231 |

EXAMPLE 5

Table 4 is a comparison of maximum dry breaking length (m) at a given dose of polymer A or D in combination with a silica microparticle at 2.5 kg/ton for a furnish from a Kraft paper manufacturer in Spain. Results from Table 4 are obtained using an INSTRON 1026 dynamometer as described in Example 4.

TABLE 4

| | | Polymer | |
|---|---|---|---|
| Dose (kg/tn) | Blank | A | D |
| — | 1240 | | |
| 1 | | 1173 | 1204 |
| 2 | | 1157.5 | 1341 |
| 6 | | 1193 | |
| 7 | | | 1214 |
| 9 | | 1402 | |
| 10.5 | | | 1397.5 |

EXAMPLE 6

Table 5 recites the dry strength of tissue manufactured it a papermill in Spain in the presence and absence of Polymer A. Paper furnish tested is a combination of 20% Northern Pine, 20% Eucalyptus and 60% Mediterranean Pine. Polymer A is dosed at 2 Kg/ton in the pulper. Additionally, 3 Kg/ton of silica is dosed after the pressure screen and 2.5 Kg/ton of Kymene (an epichlorohydrin polymer available from Ceratonia, S. A., Tarragona, Spain), right before the head of the machine.

The dry strength data in Table 5 is expressed in terms of longitudinal elongation in decanenewtons (daN). Results are obtained using an INSTRON 1000 dynamometer (available from Instron Limited Sucursal en España, S. A., Barcelona, Spain) according to the standard protocol NF Q 03-004 (Afnor, Tour Europe Cedex 7, Paris, France), Nov. 21, 1971.

TABLE 5

| Polymer | Longitudinal Elongation |
|---------|------------------------|
| None | 0.50 daN |
| A | 0.60 daN |

What is claimed is:

1. A method for improving the dry strength of a paper product comprising
   a) adding to an aqueous cellulosic papermaking slurry an effective amount of one or more retention and drainage aids and an effective amount of a sole polymeric strength additive, wherein the polymeric strength additive is a cationic dispersion polymer prepared by polymerizing in an aqueous solution of a polyvalent anionic salt in the presence of a dispersant of:
   i. a cationic diallyl-N,N-disubstituted ammonium halide monomer of formula

wherein $R_1$ and $R_2$ are independently $C_1$–$C_{20}$ alkyl, aryl or arylalkyl and X is an anionic counterion and
   ii. an acrylamide monomer of formula

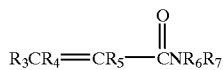

wherein
   $R_3$ and $R_4$ are independently hydrogen, $C_1$–$C_{10}$ alkyl, aryl or arylalkyl;
   $R_5$ is hydrogen or methyl and
   $R_6$ and $R_7$ are independently hydrogen or $C_1$–$C_{10}$ alkyl, wherein the cationic dispersion polymer has a reduced specific viscosity of from about 0.5 to about 8 deciliters per gram, measured in 1.0 N ammonium nitrate solution, and a cationic charge of from about 25 mole percent to about 50 mole percent;
   b) draining the slurry to form a sheet; and
   c) drying the sheet.

2. The method of claim 1 wherein the cationic diallyl-N,N-disubstituted ammonium monomer is diallyldimethyl ammonium chloride and the acrylamide monomer is acrylamide.

3. The method of claim 1 wherein the cationic dispersion polymer has a reduced specific viscosity of from about 2 to about 6 deciliters per gram, measured in 1.0 N ammonium nitrate solution.

4. The method of claim 1 wherein the dispersion polymer has a cationic charge of about 30 mole percent.

5. The method of claim 1 wherein the cationic dispersion polymer is added to the papermaking slurry in an amount of from about 1 to about 15 kg/ton of dry paper product.

* * * * *